United States Patent
Yun

(10) Patent No.: US 7,418,361 B2
(45) Date of Patent: Aug. 26, 2008

(54) METHOD OF CORRECTING SPEED OF ENCODER AND APPARATUS THEREFOR

(75) Inventor: Young-jung Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 49 days.

(21) Appl. No.: 11/370,954

(22) Filed: Mar. 9, 2006

(65) Prior Publication Data

US 2006/0266936 A1 Nov. 30, 2006

(30) Foreign Application Priority Data

May 28, 2005 (KR) .................. 10-2005-0045308

(51) Int. Cl.
*G06F 3/01* (2006.01)
(52) U.S. Cl. .............. 702/145; 702/702; 702/146; 702/163; 702/188
(58) Field of Classification Search ............ 702/94, 702/138, 163, 182, 183, 188, 145, 146; 250/231.13; 341/13; 700/32, 220; 235/462.01; 236/462.1
See application file for complete search history.

(56) References Cited

U.S. PATENT DOCUMENTS 6,445,961 B1* 9/2002 Melvin ............... 700/32
6,756,582 B2* 6/2004 Stridsberg ............ 250/231.13
6,877,832 B2* 4/2005 Smith et al. ............ 347/10
6,907,316 B2* 6/2005 Bader et al. ............ 700/220

FOREIGN PATENT DOCUMENTS

| CN | 1282015 A | 1/2001 |
| JP | 2000-188881 | 7/2000 |
| KR | 1994-0009793 | 5/1994 |
| KR | 1994-009793 | 5/1994 |
| KR | 2000-0010053 | 6/2000 |

* cited by examiner

*Primary Examiner*—Eliseo Ramos-Feliciano
*Assistant Examiner*—Felix Suarez
(74) *Attorney, Agent, or Firm*—Roylance, Abrams, Berdo & Goodman, L.L.P.

(57) ABSTRACT

A method of correcting the speed of an encoder and an apparatus therefor are provided. The method includes the steps of detecting an electrical signal corresponding to a driving speed of a motor, calculating driving speed values of the motor in sections of the electrical signal, respectively, storing the calculated speed values in the order of calculation, selecting an intermediate speed value among the speed values calculated from the three or more continuous sections, and correcting the driving speed of the motor in accordance with the selected intermediate speed value.

19 Claims, 4 Drawing Sheets

METHOD OF CORRECTING SPEED OF ENCODER AND APPARATUS THEREFOR

This application claims benefit under 35 U.S.C. § 119(a) of Korean Patent Application No. 2005-45308, filed on May 28, 2005, the entire contents of which are hereby incorporated by reference.

BACKGROUND OF THE INVENTION

1. Field of the Invention

The present invention relates to a method of correcting a speed of an encoder and an apparatus therefore. More particularly, the present invention relates to a method of correcting a speed of an encoder by selecting an intermediate speed value and an apparatus therefor.

2. Description of the Related Art

An optical encoder method is commonly used for detecting a driving speed of a driving shaft such as a motor or a driving speed of the driving shaft of a driven system driven by the motor.

According to the optical encoder method, a disk along whose circumference a plurality of slits are arranged at regular intervals is fixed to the driving shaft of the motor, and an encoder sensor unit including a light emitting portion and a light receiving portion detects the above-described slits.

A controlling unit calculates the driving speed of the motor by an electrical signal output from the encoder sensor unit.

A method of calculating the driving speed of the motor will now be described. The driving speed is calculated through an H level section and an L level section of the electrical signal output from the encoder sensor unit. The position of the encoder sensor unit is set such that a length of the H level section is equal to a length of the L level section.

However, one difficulty experienced when the driving speed of the motor is detected by such a method, is that in order to make the length of the H level section of the electrical signal output from the encoder sensor unit equal to the length of the L level section of the electrical signal output from the encoder sensor unit, it is required to precisely install the encoder sensor unit, which may require significant effort.

When the encoder sensor unit is not precisely installed, errors are generated in detecting the driving speed of the motor by the length of the H level section of the electrical signal output from the encoder sensor and the length of the L level section of the electrical signal output from the encoder sensor. In order to solve such a problem, according to a conventional method of correcting the driving speed of the encoder, the sum of the length of the H level section and the length of the L level section is set to one period to measure a corresponding speed.

However, according to the conventional art, although the slits are arranged at regular intervals to total 360 degrees in manufacturing a wheel encoder, the distance between the first slit and the last slit may not be perfectly uniform. Thus, the speed detected in the corresponding period includes an error value due to a deviation in the distance between the slits.

SUMMARY OF THE INVENTION

Embodiments of the present invention have been developed to solve the above and other problems associated with the related art, and to provide other advantages that will be apparent from the following description. A feature of exemplary embodiments of the present invention is to provide a method of correcting the speed of an encoder by selecting an intermediate speed value and an apparatus therefor.

In order to achieve the above objects of exemplary embodiments of the present invention, there is provided a method of correcting a speed of an encoder, the method comprising detecting an electrical signal corresponding to a driving speed of a motor, calculating driving speed values of the motor in sections of the electrical signal, respectively, storing the calculated speed values in the order of calculation, selecting an intermediate speed value among the speed values calculated from the three or more continuous sections, and correcting the driving speed of the motor in accordance with the selected intermediate speed value.

Preferably, in the storing of the calculated speed values, a speed value stored in a second register is stored in a third register, a speed value stored in a first register is stored in the second register, and the selected speed value is stored in the first register.

Also, in the selecting of the intermediate speed value, a value closest to an average value of the speed values calculated from the three or more continuous sections is selected as the intermediate speed value.

The sections of the electrical signal may correspond to one period of the electrical signal.

The sections of the electrical period may correspond to two periods of the electrical signal.

The electrical signal is preferably generated by rotating a wheel encoder connected to a driving shaft of the motor.

The electrical signal is may also be generated by linearly driving a strip encoder connected to a driving shaft of the motor.

The electrical signal is preferably an analog-to-digital converted signal.

The storing of the calculated speed values is preferably performed by three or more registers.

The driving speed of the motor is preferably corrected by a motor driver unit that receives the intermediate speed value.

On the other hand, there is provided an apparatus for correcting a speed of an encoder. The apparatus comprises an encoder sensor unit for detecting an electrical signal corresponding to a driving speed of a motor. A controlling unit calculates driving speed values of the motor from sections of the electrical signal, respectively, to select an intermediate speed value using the speed values selected from the three or more continuous sections. A storage unit stores the selected speed values in the order of calculation, and a motor driver unit corrects the driving speed of the motor in accordance with the selected intermediate speed value.

Preferably, the storage unit stores a speed value stored in a second register in a third register, stores a speed value stored in a first register in the second register, and stores the calculated speed value in the first register.

The controlling unit preferably selects a value closest to an average value of the speed values calculated from the three or more continuous sections as the intermediate speed value.

The sections of the electrical signal may correspond to one period of the electrical signal.

The sections of the electrical signal may also correspond to two periods of the electrical signal.

The electrical signal is preferably generated by rotating a wheel encoder connected to a driving shaft of the motor.

The electrical signal may also be generated by linearly driving a strip encoder connected to the driving shaft of the motor.

The electrical signal is preferably an analog-to-digital converted signal.

The storage unit preferably comprises three or more registers.

BRIEF DESCRIPTION OF THE DRAWINGS

The above aspects and features of exemplary embodiments of the present invention will be more apparent with reference to the accompanying drawings, in which.

Throughout the drawings, it should be understood that like reference numbers refer to like elements, features and structures.

DETAILED DESCRIPTION OF EXEMPLARY EMBODIMENTS

Exemplary embodiments of the present invention will now be described in greater detail with reference to the accompanying drawings.

Figure 1:
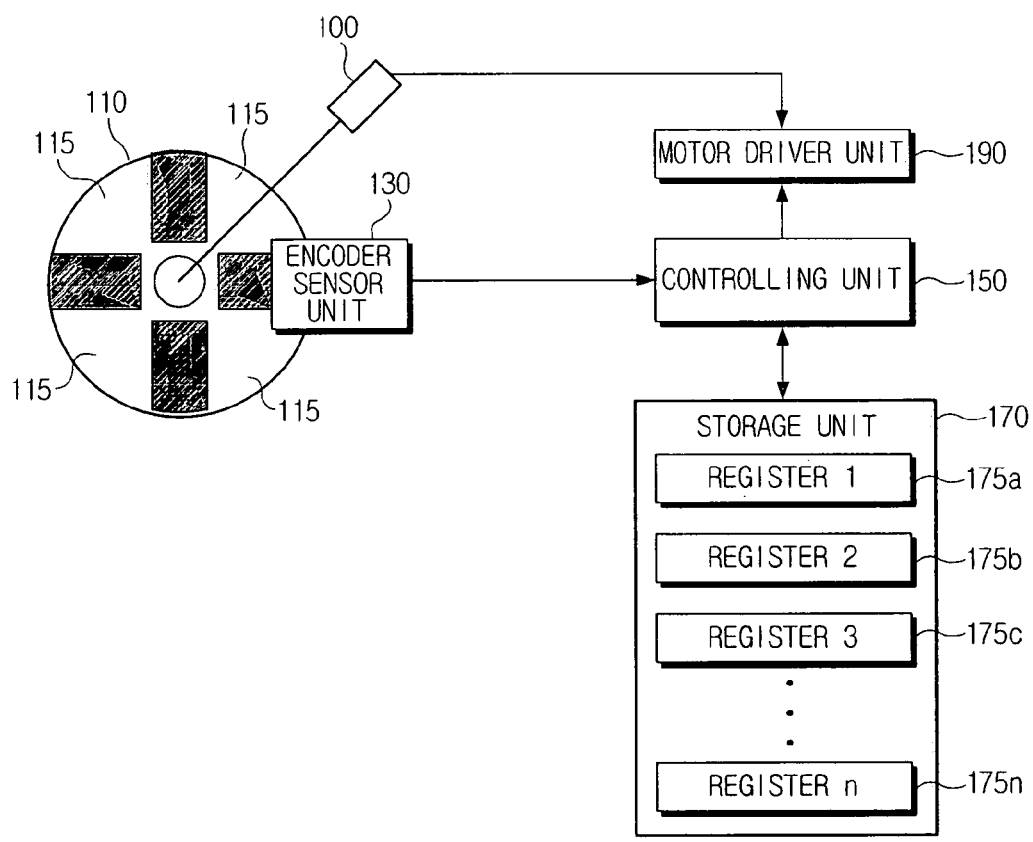
FIG. 1 illustrates the structure of an apparatus for correcting the speed of an encoder according to an exemplary embodiment of the present invention.

FIG. 1 illustrates the structure of an apparatus for correcting the speed of an encoder according to an exemplary embodiment of the present invention.

The apparatus for correcting the speed of an encoder according to an exemplary embodiment of the present invention includes a motor 100, a wheel encoder 110, an encoder sensor unit 130, a controlling unit 150, a storage unit 170 and a motor driver unit 190.

Slits 115 are arranged in the wheel encoder 110 at uniform intervals and the storage unit 170 includes n registers 175a, 175b, 175c, . . . , and 175n.

The motor 100 is typically a DC motor and is driven by the control of the motor driver unit 190. The wheel encoder 110 is connected to the driving shaft of the motor 100 to be driven by driving the motor 100. It should be understood that the wheel encoder 110 is merely exemplary and may be replaced by a strip encoder (not shown) or any other suitable encoder device. In this case, the strip encoder is linearly driven by driving the motor 100.

Also, the slits 115 are arranged in the wheel encoder 110 (or the strip encoder) at uniform intervals. An electrical signal output from the encoder sensor unit 130 corresponds to H level sections when the encoder sensor unit 130 is positioned on the slits 115 and corresponds to L level sections when the encoder sensor unit 130 is positioned on the parts excluding the slits 115.

The encoder sensor unit 130 includes a light emitting portion and a light receiving portion and outputs an electrical signal in order to measure the driving speed of the wheel encoder 110. The output electrical signal is preferably an analog-to-digital converted signal, although any other suitable arrangements may also be used.

The controlling unit 150 calculates the driving speed values of the motor from the respective sections of the above-described electrical signal, sequentially stores the driving speed values in the storage unit, selects an intermediate speed value among three or more continuous driving speed values through the stored driving speed values, and transmits the intermediate speed value to the motor driver unit 190.

The storage unit 170 stores the driving speed values from the controlling unit 150 and preferably includes three or more registers. According to an exemplary embodiment of the present invention, the storage unit 170 may be included in the above-described controlling unit 150. An operation principle in the case where the driving speed values calculated from the controlling unit 150 are stored in the storage unit 170, and the storage unit 170 includes three or more registers will now be described.

In the case where the speed values are previously stored in first, second, and third registers 175a, 175b, and 175c, when speed values in a new period are calculated, the speed values stored in the third register 175c are deleted, the speed values stored in the second register 175b are stored in the third register 175c, and the speed values stored in the first register 175a are stored in the second register 175b. Next, the driving speed values calculated from the controlling unit 150 are stored in the first register 175a.

The motor driver unit 190 receives the intermediate speed value of the continuous three or more driving speed values calculated by the controlling unit 150 and controls the driving speed of the motor 100 using the same.

Figure 2:
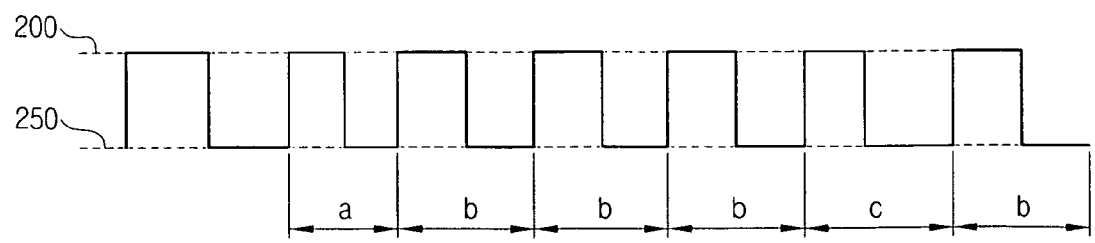
FIG. 2 illustrates an electrical signal output from an encoder sensor unit according to an exemplary embodiment of the present invention.

FIG. 2 illustrates an electrical signal output from an encoder sensor unit according to an exemplary embodiment of the present invention. Referring to FIG. 2, it is possible to determine the driving speeds a, b, and c of the motor 100 calculated by the controlling unit 150 in the respective sections of the electrical signal output from the encoder sensor unit 130.

The periods of the electrical signal illustrated in FIG. 2 correspond to one period of the electrical signal and one period consists of the H level periods 200 and the L level periods 250.

However, according to another exemplary embodiment of the present invention, the controlling unit 150 may calculate the driving speed value of the motor in each two periods of the electrical signal. For purposes of describing the operation principle of an exemplary embodiment of the present invention, it is assumed that a<b<c.

TABLE 1 illustrates a principle in which the driving speed values calculated from the respective sections of the electrical signal are stored in the registers 175a, 175b, 175c, . . . , and 175n of the storage unit 170.

TABLE 1

|  | Section 1 | Section 2 | Section 3 | Section 4 | Section 5 | Section 6 |
|---|---|---|---|---|---|---|
| Register 1 | A | B | b | B | c | b |
| Register 2 | — | A | b | B | b | c |
| Register 3 | — | B | a | B | b | b |
| Intermediate speed | — | B | b | B | b | b |

Hereinafter, the method of correcting the speed of the encoder according to an exemplary embodiment of the present invention will be described with reference to FIGS. 1, 2 and TABLE 1. In describing the method of correcting the speed of the encoder according to an exemplary embodiment of the present invention, it is assumed that the three registers are included in the storage unit 170.

First, when a power source is applied from the outside, the motor 100 starts to be driven by the motor driver unit 190. The wheel encoder 110 connected to the driving shaft of the motor 100 starts to be driven. At this time, the encoder sensor unit 130 outputs an electrical signal corresponding to the section 1.

The controlling unit 150 calculates the driving speed of the motor 100 from the section 1 through the electrical signal of the encoder sensor unit 130 and the speed is a. The controlling unit 150 stores the speed value a calculated from the section 1 in the first register 175a in the storage unit 170.

While the motor 100 is continuously driven, the encoder sensor unit 130 outputs an electrical signal corresponding to the section 2. The controlling unit 150 calculates the driving speed of the motor 100 from the section 2 through the electrical signal of the encoder sensor unit 130 and the speed is b.

The controlling unit 150 stores the speed value a calculated from the section 1 stored in the first register 175a in the second register 175b and stores the speed value a calculated from the section 2 in the first register 175a in the storage unit 170.

While the motor 100 is continuously driven, the encoder sensor unit 130 outputs an electrical signal corresponding to the section 3. The controlling unit 150 calculates the driving speed of the motor 100 from the section 3 through the electrical signal of the encoder sensor unit 130 and the speed is b.

The controlling unit 150 stores the speed value a stored in the second register 175b in the third register 175c, stores the speed value b stored in the first register 175a in the second register 175b, and stores the speed value b calculated from the section 3 in the first register 175a of the storage unit 170.

Next, the controlling unit 150 calculates the average value of the speed values a, b, and c stored in the first, second and third registers 175a, 175b and 175c and excludes the respective speed values in the order where the speed value whose difference from the average value is largest is first excluded. As a result, the speed value b stored in the second register 175b is left and the value is the intermediate speed value in the sections 1, 2, and 3.

The controlling unit 150 transmits the intermediate speed value b to the driver unit 190 and the motor driver unit 190 controls the driving speed of the motor 100 using the intermediate speed value b received from the controlling unit 150.

While the motor 100 is continuously driven, the encoder sensor unit 130 outputs an electrical signal corresponding to section 4. The controlling unit 150 calculates the driving speed of the motor 100 from section 4 through the electrical signal of the encoder sensor unit 130 and the speed is b.

The controlling unit 150 calculates speed value a stored from the third register 175c, stores speed value b stored in the second register 175b in the third register 175c, stores speed value b stored in the first register 175a in the second register 175b, and stores speed value b calculated from section 4 in the first register 175a in the storage unit 170.

Next, the controlling unit 150 calculates the average value of the speed values b, b, and b stored in the first, second, and third registers 175a, 175b, and 175c. The speed values have no difference from b that is the average value. In this case, b is the intermediate speed value in the sections 2, 3, and 4.

The controlling unit 150 transmits the intermediate speed value b to the driver unit 190 and the driver unit 190 controls the driving speed of the motor 100 using the received intermediate speed value b.

While the motor 100 is continuously driven, the encoder sensor unit 130 outputs an electrical signal corresponding to section 5. The controlling unit 150 calculates the driving speed of the motor 100 from section 5 through the electrical signal of the encoder sensor unit 130 and the speed is c.

The controlling unit deletes speed value b stored in the third register 175c, stores speed value b stored in the second register 175b in the third register 175c, stores speed value b stored in the first register 175a in the second register 175b, and stores speed value c calculated from speed 5 in the first register 175a in the storage unit 170.

Next, the controlling unit 150 calculates the average value of the speed values c, b, and b stored in the first, second, and third registers 175a, 175b, and 175c and excludes the respective speed values in the order where the speed value whose difference from the average value is largest is first excluded. As a result, the speed value b is left and the value is the intermediate speed value in the sections 3, 4, and 5.

The controlling unit 150 transmits the intermediate speed value b to the driver unit 190 and the motor driver unit 190 controls the driving speed of the motor 100 using the received intermediate speed value b.

While the motor 100 is continuously driven, the encoder sensor unit 130 outputs an electrical signal corresponding to section 6. The controlling unit 150 calculates the driving speed of the motor 100 from section 6 through the electrical signal of the encoder sensor unit 130 and the speed is b.

The controlling unit 150 deletes speed value b stored in the third register 175c, stores speed value b stored in the second register 175b in the third register 175c, stores speed value c stored in the first register 175a in the second register 175b, and stores speed value b calculated from section 6 in the first register 175a in the storage unit 170.

Next, the controller 150 calculates the average value of the speed values b, c, and b stored in the first, second, and third registers 175a, 175b, and 175c and excludes the respective speed values in the order in which the speed value is largest from the average value is excluded first. As a result, speed value b is left and the value is the intermediate speed value in sections 4, 5, and 6.

The controlling unit 150 transmits the intermediate speed value b to the driver unit 190 and the motor driver unit 190 controls the driving speed of the motor 100 using the received intermediate speed value b.

Anyone skilled in the art can easily apply the foregoing description to cases in which the numbers of registers in the storage unit 170 are 4, 5, and 6 or more with reference to the case described above in which the number of registers in the storage unit 170 is 3.

When the number of registers is 5, the intermediate speed value is determined from the average value of the speed values in the three sections excluding the largest value and the smallest value among the speed values calculated from five continuous sections.

When the number of registers increases, the controlling unit 150 calculates the intermediate speed value of the speed values calculated from several continuous sections so that it is possible to more precisely correct the speed of the motor.

Figure 3A:
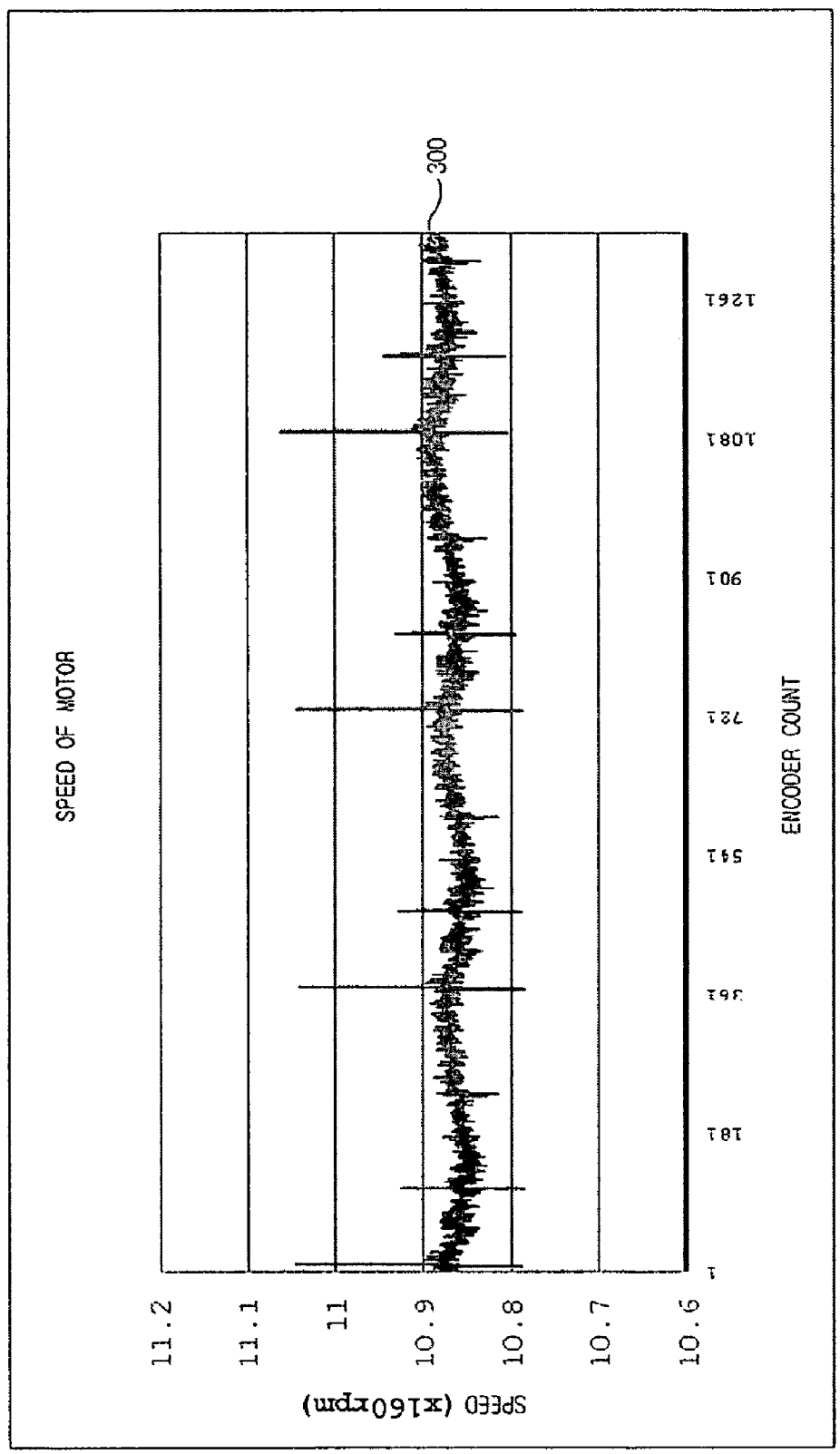
FIG. 3A is a graph illustrating a result of measuring the speeds of a motor by a conventional method of correcting the speed of an encoder.

FIG. 3A is a graph illustrating a result of measuring the speeds of the motor according to the conventional method of correcting the speed of an encoder.

Referring to the speeds 300 of the motor according to a conventional method illustrated in FIG. 3A, the speeds of the motor when encoder counts are 361, 721, and 1081 significantly deviate from the average.

Figure 3B:
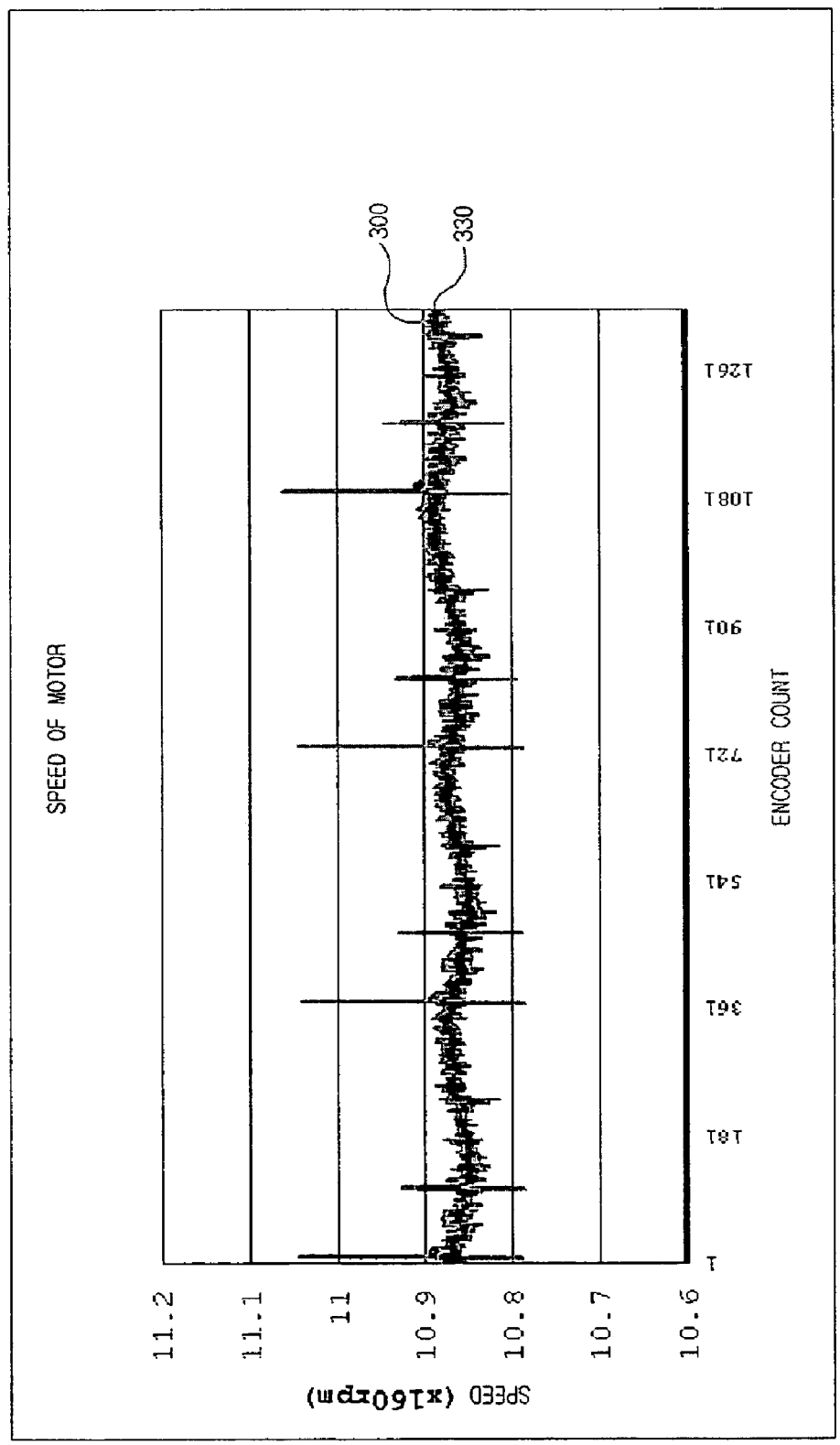
FIG. 3B is a graph comparing the result of measuring the speeds of the motor according to a conventional method with a result of measuring the speeds of a motor according to an exemplary embodiment of the present invention.

FIG. 3B is a graph comparing the result of measuring the speeds of the motor according to a conventional method with a result of measuring the speeds of a motor according to an exemplary embodiment of the present invention. The result of measuring the speeds of the motor according to an exemplary embodiment of the present invention illustrated in FIG. 3B is obtained when the number of registers is 3.

When the speeds 300 of the motor according to a conventional method are compared with the speeds 330 of the motor according to an exemplary embodiment of the present invention as illustrated in FIG. 3B, it is noted that the degree to which the speeds of the motor according to an exemplary embodiment of the present invention deviate from the average value when the encoder counts are 361, 721, and 1081 is smaller than the degree to which the speeds of the motor according to the conventional art deviate from the average value when the encoder counts are 361, 721, and 1081. Deviation in change in the speeds 330 of the motor according to an exemplary embodiment of the present invention is also smaller than deviation in change in the speeds 300 of the motor according to the conventional method in the other sections.

Figure 3C:
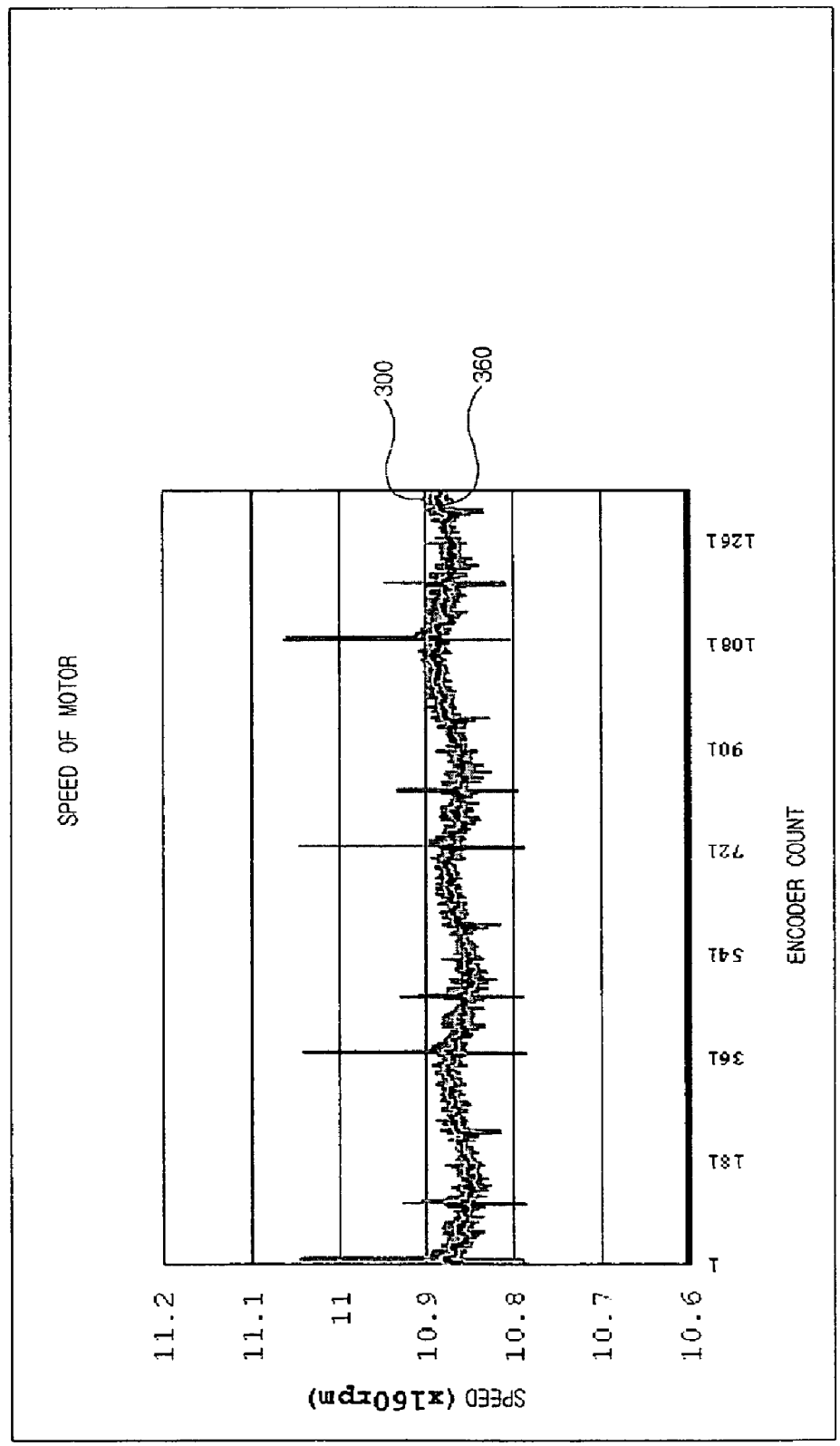
FIG. 3C is a graph comparing the result of measuring the speeds of the motor according to a conventional method with a result of measuring the speeds of a motor according to another exemplary embodiment of the present invention.

FIG. 3C is a graph comparing the result of measuring the speeds of the motor according to the conventional art with a result of measuring the speeds of a motor according to another exemplary embodiment of the present invention. The result of measuring the speeds of the motor according to the exemplary embodiment of the present invention illustrated in FIG. 3C is obtained when the number of registers is 5. The average value of the three speed values excluding the largest value and the smallest value among the speed values calculated from the five continuous sections stored in the registers may be determined as the intermediate speed value for correcting the speed of the motor.

When the speeds 300 of the motor according to a conventional method are compared with the speeds 360 of the motor according to another exemplary embodiment of the present invention as illustrated in FIG. 3C, it is noted that the degree to which the speeds of the motor according to another exemplary embodiment of the present invention deviate from the average value when the encoder counts are 361, 721, and 1081 is smaller than the degree to which the speeds 330 of the motor according to an exemplary embodiment of the invention illustrated in FIG. 3B deviate from the average value when the encoder counts are 361, 721, and 1081. Deviation in change in the speeds 360 of the motor according to another embodiment of the present invention is also smaller than deviation in change in the speeds 330 of the motor according to an exemplary embodiment of the present invention in the other sections.

As described above, according to an exemplary embodiment of the present invention it is possible to precisely control the driving speed of the motor by correctly measuring the actual driving speed value of the motor.

The foregoing embodiment and advantages are merely exemplary and are not to be construed as limiting the present invention. The present teaching can be readily applied to other types of embodiments. Also, the description of the embodiments of the present invention is intended to be illustrative, and not to limit the scope of the claims, and many alternatives, modifications, and variations will be apparent to those skilled in the art.

What is claimed is:

1. A method to correct a speed of an encoder, the method comprising:
    detecting an electrical signal corresponding to a driving speed of a motor;
    calculating driving speed values of the motor from three or more continuous sections of the electrical signal, respectively;
    storing the calculated speed values in the order of calculation;
    selecting an intermediate speed value among the speed values calculated from the three or more continuous sections; and
    correcting the driving speed of the motor based on the selected intermediate speed value.

2. The method as claimed in claim 1, wherein, in the storing of the calculated speed values, a speed value stored in a second register is stored in a third register, a speed value stored in a first register is stored in the second register, and the selected speed value is stored in the first register.

3. The method as claimed in claim 1, wherein, in the selecting of the intermediate speed value, a value closest to an average value of the speed values calculated from the three or more continuous sections is selected as the intermediate speed value.

4. The method as claimed in claim 1, wherein the sections of the electrical signal correspond to one period of the electrical signal.

5. The method as claimed in claim 1, wherein the sections of the electrical period correspond to two periods of the electrical signal.

6. The method as claimed in claim 1, wherein the electrical signal is generated by rotating a wheel encoder connected to a driving shaft of the motor.

7. The method as claimed in claim 1, wherein the electrical signal is generated by linearly driving a strip encoder connected to a driving shaft of the motor.

8. The method as claimed in claim 1, wherein the electrical signal is an analog-to-digital converted signal.

9. The method as claimed in claim 1, wherein the storing of the calculated speed values is performed by three or more registers.

10. The method as claimed in claim 1, wherein the driving speed of the motor is corrected by a motor driver unit that receives the intermediate speed value.

11. An apparatus for correcting a speed of an encoder, the apparatus comprising:
    an encoder sensor unit to detect an electrical signal corresponding to a driving speed of a motor;
    a controlling unit to calculate driving speed values of the motor from three or more continuous sections of the electrical signal, respectively, to select an intermediate speed value using the speed values selected from the three or more continuous sections;
    a storage unit to store the selected speed values in the order of calculation; and
    a motor driver unit to correct the driving speed of the motor based on the selected intermediate speed value.

12. The apparatus as claimed in claim 11, wherein the storage unit stores a speed value stored in a second register in a third register, stores a speed value stored in a first register in the second register, and stores the calculated speed value in the first register.

13. The apparatus as claimed in claim 11, wherein the controlling unit selects a value closest to an average value of the speed values calculated from the three or more continuous sections as the intermediate speed value.

14. The apparatus as claimed in claim 11, wherein the sections of the electrical signal correspond to one period of the electrical signal.

15. The apparatus as claimed in claim 11, wherein the sections of the electrical signal correspond to two periods of the electrical signal.

16. The apparatus as claimed in claim 11, wherein the electrical signal is generated by rotating a wheel encoder connected to a driving shaft of the motor.

17. The apparatus as claimed in claim 11, wherein the electrical signal is generated by linearly driving a strip encoder connected to the driving shaft of the motor.

18. The apparatus as claimed in claim 11, wherein the electrical signal is an analog-to-digital converted signal.

19. The apparatus as claimed in claim 12, wherein the storage unit comprises three or more registers.

* * * * *